US008414061B1

(12) United States Patent
Greminger

(10) Patent No.: US 8,414,061 B1
(45) Date of Patent: Apr. 9, 2013

(54) COVER FOR A GRAIN HOPPER

(76) Inventor: Russell T. Greminger, Audubon, MN (US)

( * ) Notice: Subject to any disclaimer, the term of this patent is extended or adjusted under 35 U.S.C. 154(b) by 88 days.

(21) Appl. No.: 12/984,254

(22) Filed: Jan. 4, 2011

Related U.S. Application Data

(60) Provisional application No. 61/292,336, filed on Jan. 5, 2010.

(51) Int. Cl.
*B60P 7/04* (2006.01)
(52) U.S. Cl. .................................. 296/100.18; 150/154
(58) Field of Classification Search .............. 160/368.1, 160/370.21; 296/100.15, 100.16, 100.17, 296/100.18, 95.1; 150/154, 166; 410/97
See application file for complete search history.

(56) References Cited

U.S. PATENT DOCUMENTS

| | | | |
|---|---|---|---|
| 2,044,574 A | 7/1953 | Mercier | |
| 3,163,280 A | 12/1964 | Haugland | |
| 3,215,257 A | 11/1965 | Albers | |
| 4,036,411 A | 7/1977 | Westhoff | |
| 4,090,604 A | 5/1978 | Reifert | |
| 4,340,075 A * | 7/1982 | Medeiros | 135/120.1 |
| 4,457,444 A | 7/1984 | Wold | |
| 4,502,610 A | 3/1985 | Todd | |
| 4,699,393 A * | 10/1987 | Schweigert | 280/460.1 |
| 4,727,977 A | 3/1988 | Arnson | |
| 4,823,707 A * | 4/1989 | Salsbury et al. | 105/377.02 |
| 4,927,109 A * | 5/1990 | Wilson | 248/354.3 |
| 5,228,408 A * | 7/1993 | Jannausch | 114/361 |
| 5,301,995 A * | 4/1994 | Isler | 296/100.17 |
| 5,487,584 A * | 1/1996 | Jespersen | 296/100.18 |
| 5,664,824 A * | 9/1997 | Stephens et al. | 296/100.17 |
| 5,944,039 A * | 8/1999 | Bergeron | 135/119 |
| 6,179,463 B1 | 1/2001 | Daniels-Romero | |
| 6,659,035 B2 * | 12/2003 | Treytiak | 114/361 |
| 7,028,731 B1 | 4/2006 | Jones | |
| 7,146,926 B1 * | 12/2006 | Yang | 114/361 |
| 7,347,159 B1 * | 3/2008 | Thompson | 114/361 |
| 2002/0096902 A1 * | 7/2002 | Oswald et al. | 296/39.2 |
| 2010/0095993 A1 * | 4/2010 | Jesus | 135/119 |

OTHER PUBLICATIONS http://www.grainaugers.com/products.aspx?x=yWf3k12BOHMJGkZxTeU%2bT88h6QGsnJHa; Westfield Industries; 2010.

* cited by examiner

*Primary Examiner* — David Purol
(74) *Attorney, Agent, or Firm* — Neustel Law Offices

(57) ABSTRACT

A cover for a grain hopper for shielding the opening of a hopper opening to shed rain, snow, and debris from entering the hopper opening. The cover generally includes a flexible and water-impervious sheet body adapted to be removably secured over an opening of a grain hopper leading to an auger, wherein the sheet body has a resilient cord extending within a peripheral cavity for wrapping around the outside peripheral edge of the hopper and including multiple bow members for forming an arcuate sheet body over the hopper, wherein the bow members are located along an interior surface of the sheet body and removably engage the inside peripheral edge of the hopper. A flap including fastening material may also be used to extend over the covering of the inlet of the auger. The flap extends from the forward end of the sheet body.

12 Claims, 7 Drawing Sheets

US 8,414,061 B1

COVER FOR A GRAIN HOPPER

CROSS REFERENCE TO RELATED APPLICATIONS

I hereby claim benefit under Title 35, United States Code, Section 119(e) of U.S. provisional patent application Ser. No. 61/292,336 filed Jan. 5, 2010. The 61/292,336 application is currently pending. The 61/292,336 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a cover and more specifically it relates to a cover for a grain hopper for efficiently shielding the opening of a hopper to shed rain, snow, debris, etc. therefrom.

2. Description of the Related Art

Any discussion of the related art throughout the specification should in no way be considered as an admission that such related art is widely known or forms part of common general knowledge in the field.

Covering devices, such as conventional tarps or other plastic sheeting has been used in the past to shield the openings of grain hoppers or other agricultural equipment to prevent rain, snow, and debris from entering the opening thus possibly causing rust, damaging crop material therein, or slowing production. One problem with conventional covering devices is that the covering device does not securely retain itself to the grain hopper thus resulting in the covering device blowing away or being misplaced in high winds or over time. Another problem associated with convention covering devices for grain hoppers is that the covering device sags or collapses when excess rain, snow, or debris is placed thereon, thus ultimately leaving a portion of the opening of the grain hopper uncovered. Because of the inherent problems with the related art, there is a need for a new and improved cover for a grain hopper for efficiently shielding the opening of a hopper to shed rain, snow, debris, etc. therefrom.

BRIEF SUMMARY OF THE INVENTION

A system for efficiently shielding the opening of a hopper to shed rain, snow, debris, etc. therefrom. The invention generally relates to a cover which includes which includes a flexible and water-impervious sheet body adapted to be removably secured over an opening of a grain hopper leading to an auger, wherein the sheet body has a resilient cord extending within a peripheral cavity for wrapping around the outside peripheral edge of the hopper and including multiple bow members for forming an arcuate sheet body over the hopper, wherein the bow members are located along an interior surface of the sheet body and removably engage the inside peripheral edge of the hopper. A flap including fastening material may also be used to extend over the covering of the inlet of the auger. The flap extends from the forward end of the sheet body.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
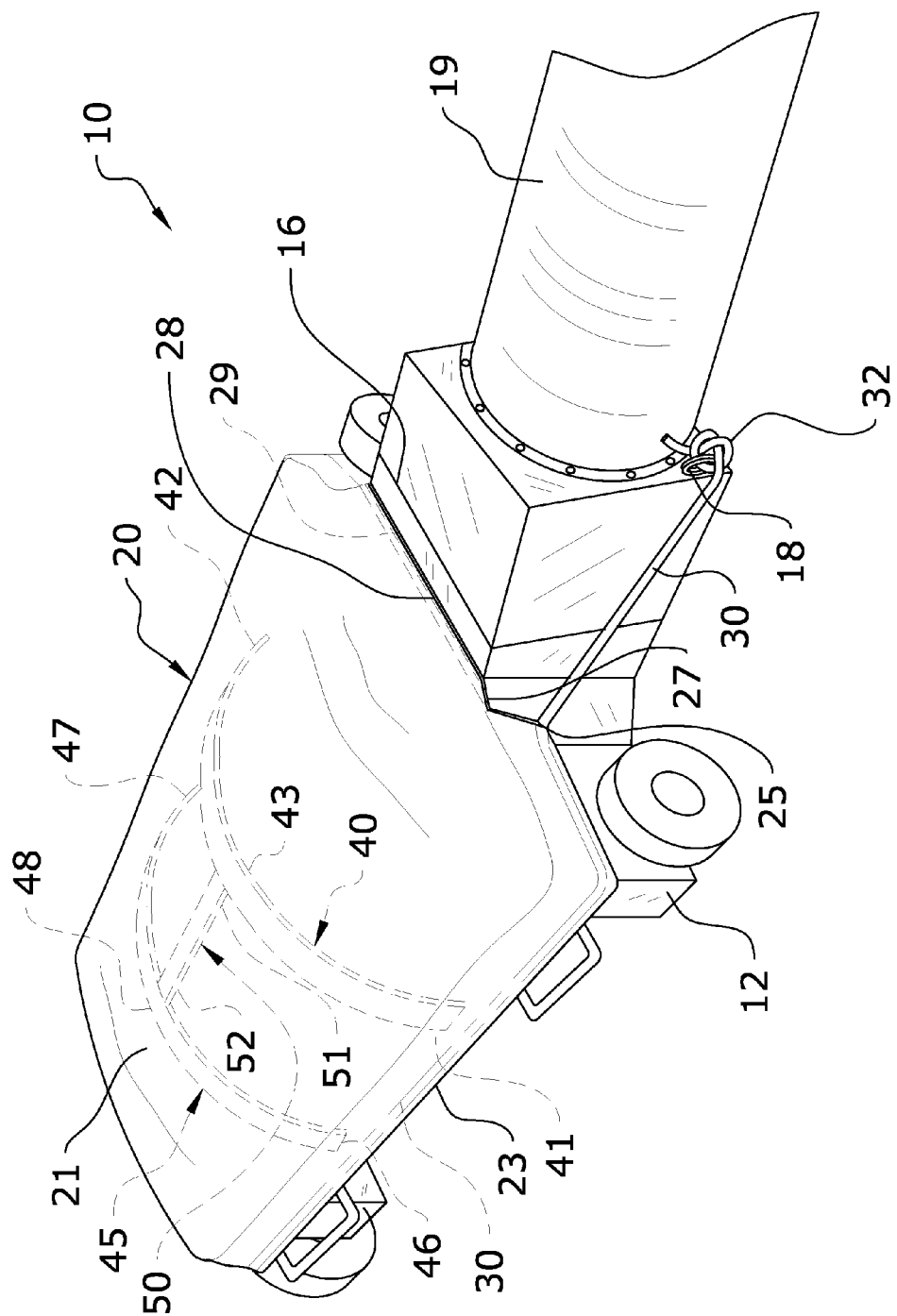
FIG. 1 is an upper perspective view of the present invention attached to a grain hopper showing the grain hopper in a stationary position.
Figure 2:
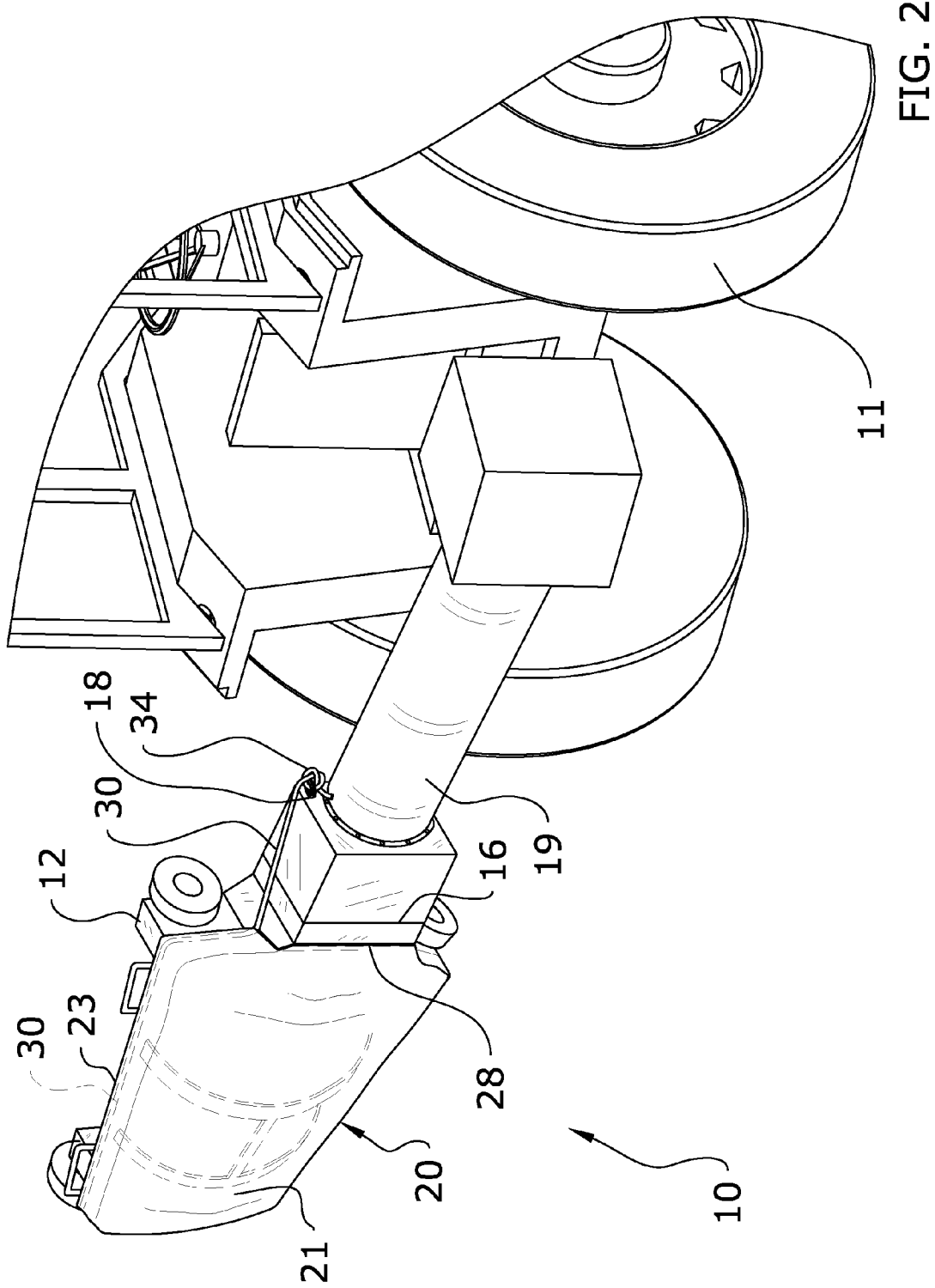
FIG. 2 is an upper perspective view of the present invention attached to a grain hopper showing the grain hopper in a transport position.
Figure 3:
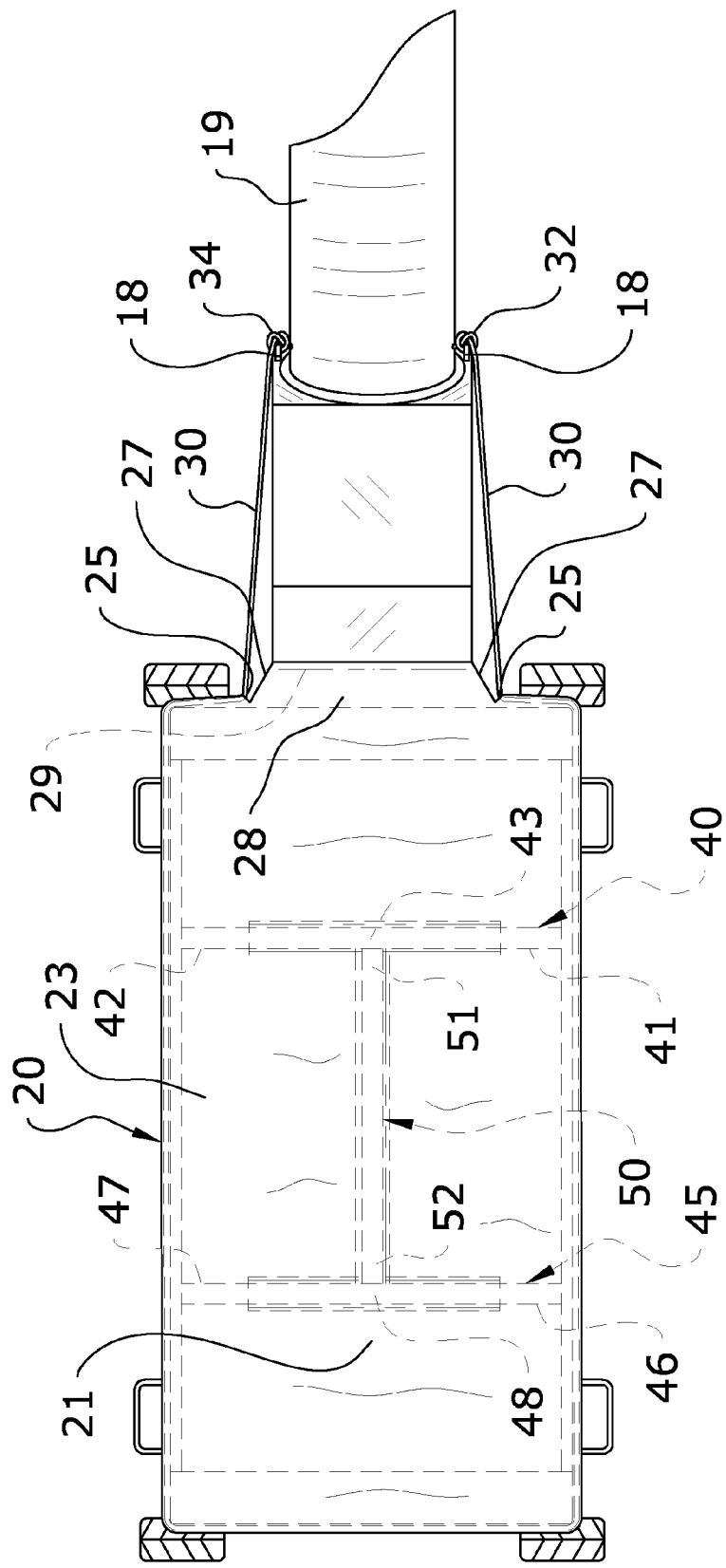
FIG. 3 is a top view of the present invention attached to a grain hopper.
Figure 4:
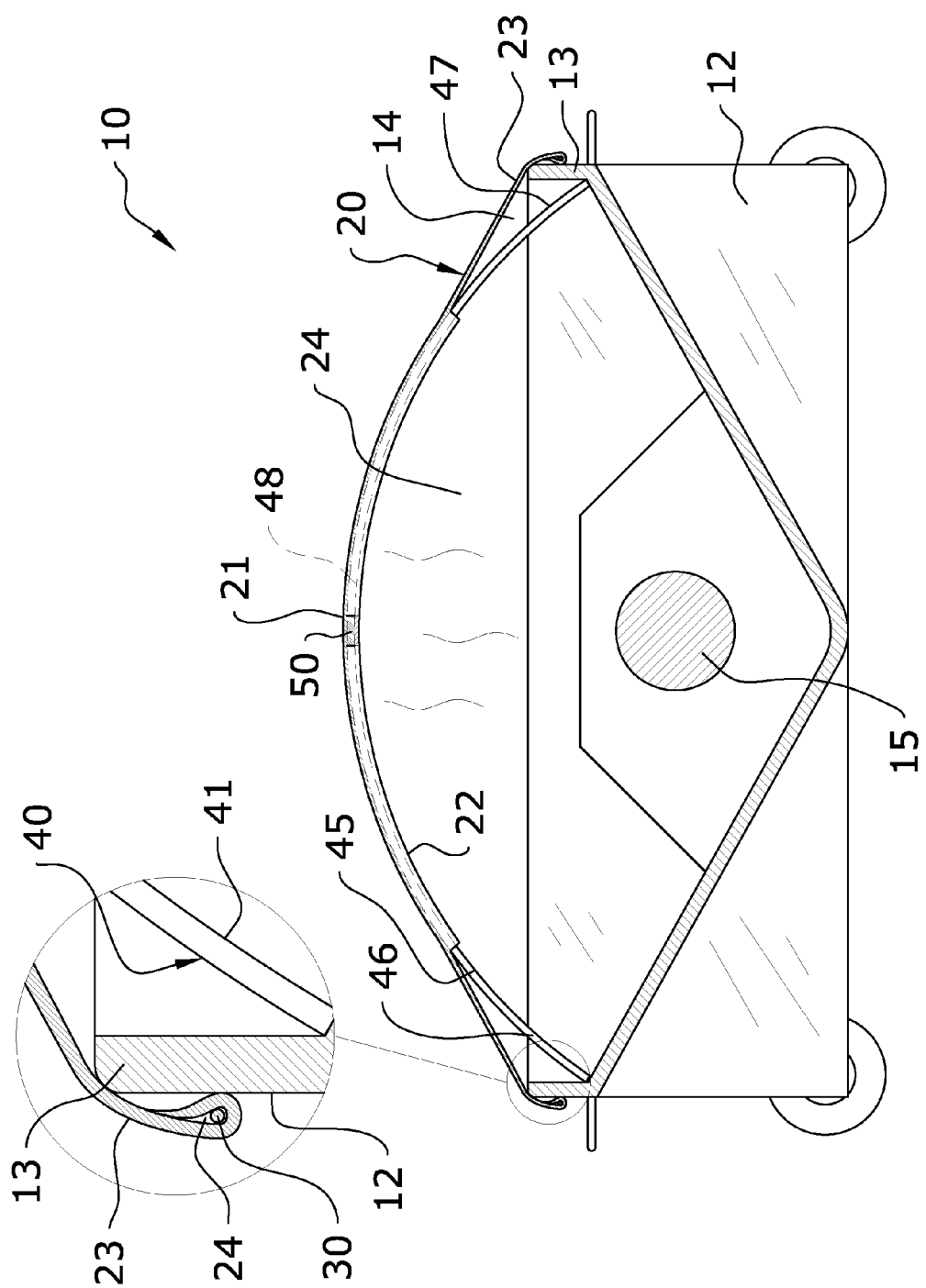
FIG. 4 is a lateral sectional view of the present invention and illustrating the resilient cord extending through the peripheral edge of the sheet body.
Figure 5:
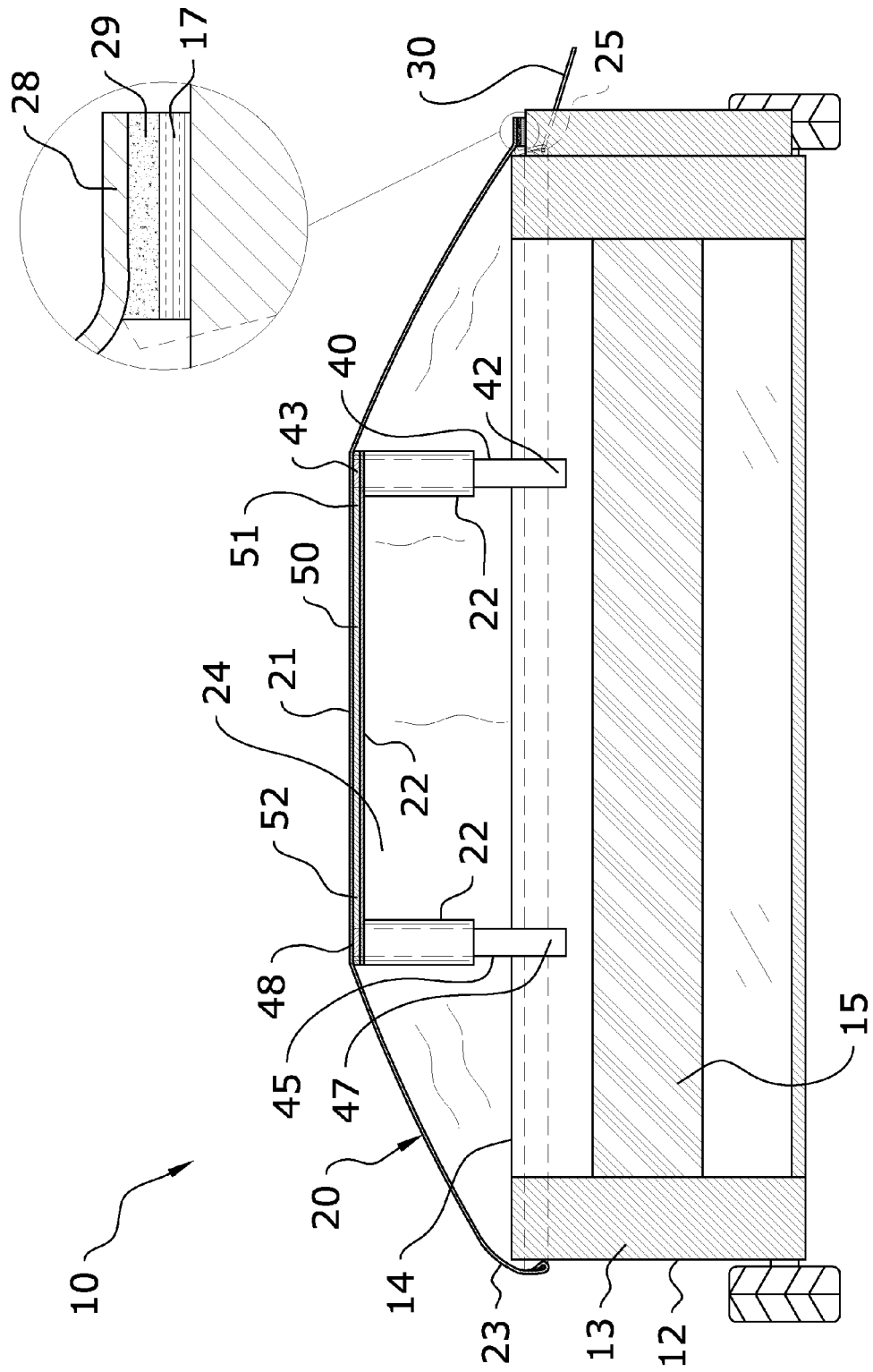
FIG. 5 is a lengthwise sectional view of the present invention.
Figure 6:
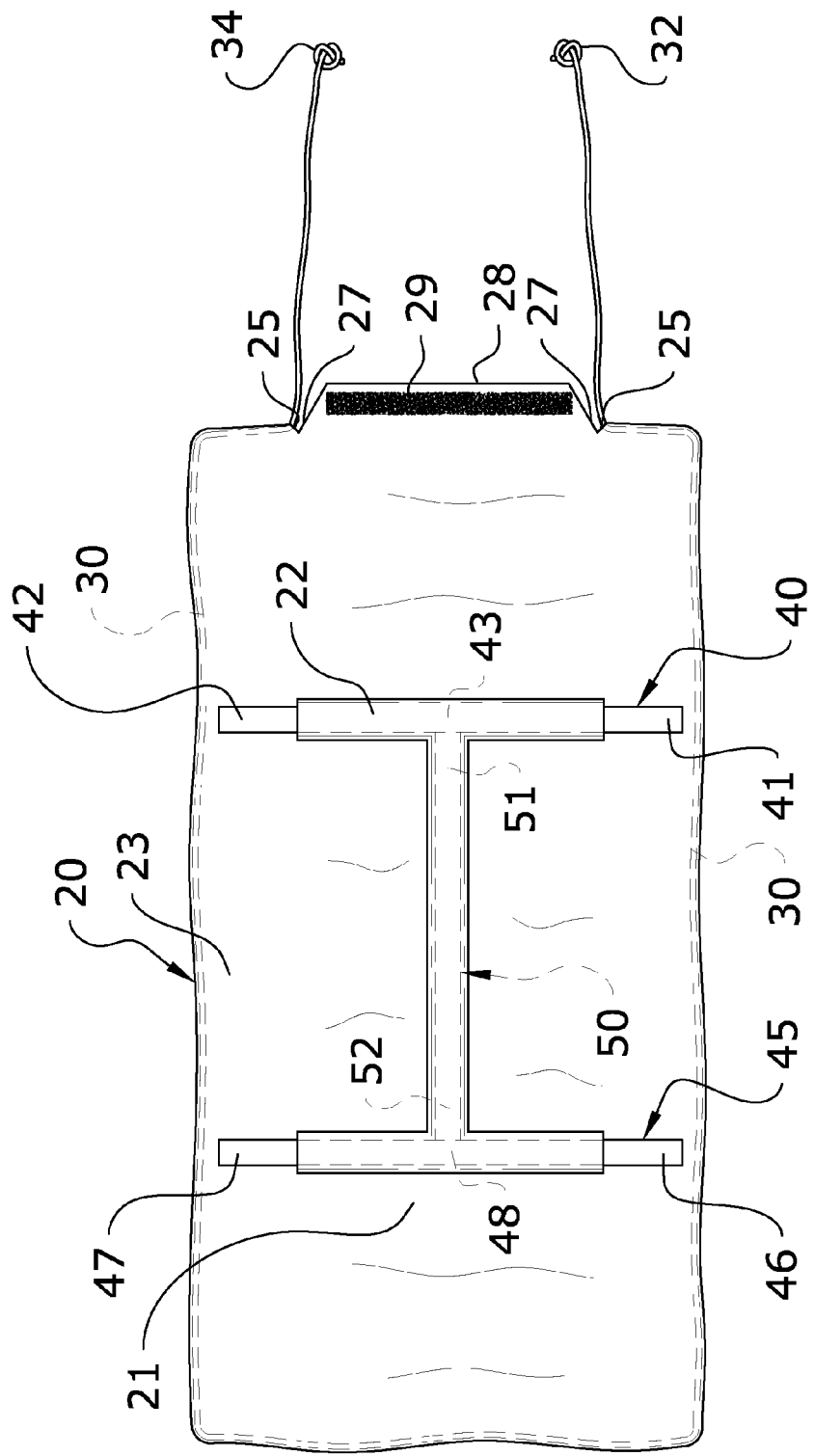
FIG. 6 is a bottom view of the present invention.

Turning now descriptively to the drawings, in which similar reference characters denote similar elements throughout the several views, FIGS. 1 through 7 illustrate a cover for a grain hopper 10, which comprises a flexible and water-impervious sheet body 20 adapted to be removably secured over an opening 14 of a grain hopper 12 leading to an auger 19, wherein the sheet body 20 has an elongated member, such as a resilient cord 30 extending within a peripheral cavity 24 for wrapping around the outside peripheral edge 13 of the hopper 12 and including multiple bow members 40, 45 for forming an arcuate sheet body 20 over the hopper 12, wherein the bow members 40, 45 are located along an interior surface of the sheet body 20 and removably engage the inside peripheral edge 13 of the hopper 12. A flap 28 including fastening material 29 may also be used to extend over the covering of the inlet 16 of the auger 19. The flap 28 extends from the forward end of the sheet body 20.

The hopper 12 is generally comprised of a grain or agricultural hopper and may include wheels, handles, an opening 14 leading to an internal transfer mechanism 15, such as an auger, etc. Leading from the hopper 12 is generally a conventional grain auger 19. The cover 10 attaches to the hoper 12 as a self-supported and retained assembly, wherein the hopper 12 and/or auger 19 may be moved from a stationary to a transport or various other positions without removing the cover 10 from the hopper 12.

B. Sheet Body

The sheet body 20 is generally comprised of a planar material being comprised of a durable structure and also preferably impervious to water, snow, wind, etc. to prevent the like from entering within the opening 14 of the hopper 12. The sheet body 20 may be comprised of various sizes to accommodate various size hoppers 12.

The sheet body 20 generally includes a center portion 21 to extend over the opening 14 of the hopper 12 and a peripheral portion 23 extending from the center portion 21 to extend over the outside of the peripheral edge 13 of the hopper 12. The center portion 21 and the peripheral portion 23 are generally comprised of an integral one-piece structure; however various alternate embodiments may be appreciated.

The center portion 21 generally includes an inner, second layer 22 extending along the interior of at least some of the center portion 21. The second layer 22 is preferably used to secure the bow members 40, 45 and the connecting member 50 to the center portion 21 of the sheet body 20 so that the bow members 40, 45 and the connecting members 50 may be retained via the second layer 22 being sewn upon the center portion 21 of the sheet body 20 and the members 40, 45, 50 positioned therebetween. It is appreciated that the entire sheet body 20 may be layered or only a portion of the sheet body 20 need be layered.

Extending within the peripheral portion 23 of the sheet body 20 is a cavity 24, such as by being formed by looping the peripheral portion 23 or another layer to parallel the peripheral portion 23. The cavity 24 preferably extends along the length of the entire peripheral portion 23 to receive the resilient cord 30 within. The peripheral portion 23 also includes a pair of front openings 25 extending therethrough leading to the cavity 24 for opposing ends 32, 34 of the resilient cord 30 to exit the cavity 24 on both sides of the inlet covering 16 of the auger 19 and connect to the hopper 12 or auger 19.

The sheet body 20 also includes an integrally formed flexible flap 28 defined by a pair of notches 27 at the front end of the sheet body 20. The flap 28 is preferably centered laterally with the sheet body 20. The flap 28 extends forwardly over the inlet covering 16 of the auger 19 to prevent debris, rain, snow from entering within the inlet leading to the auger 19. The flap 28 may also include a fastener 29 along an underside for securely attaching to the inlet covering 16 so as not to be blown away via wind, etc. The fastener 29 may be comprised of various structures, such as but not limited to a hook and loop structure, such as VELCRO. Likewise, another fastener 17 may be positioned on the external side of the covering of the inlet 16 to receive and attach to the fastener 29 of the flap 28. Other types of fasteners 17, 29 may be appreciated, such as hooks, snaps, or various other types of detachable fasteners.

C. Elongated Member

The elongated member or preferred resilient cord 30 is utilized to retain the peripheral portion 23 of the sheet body 20 tight around the peripheral edge 13 of the opening 14 of the hopper 12 by decreasing the diameter of the peripheral portion 23 of the sheet body 20. The resilient cord 30 extends through the cavity 24 of the peripheral portion 23 of the sheet body 20. The resilient cord 30 may be comprised of various structures, such as having elastic, flexible, and durable properties, such as but not limited to bungee cord construction. It is appreciated that other types of elongated members may be utilized rather than the resilient cord.

In the preferred embodiment, the resilient cord 30 includes a first connecting end 32 and a second connecting end 34. The first connecting end 32 and the second connecting end 34 both extend through opposing front openings 25 (on opposing lateral sides of the flap 28). The first connecting end 32 and the second connecting end 34 connect to the hopper 12 or auger 19 at a suitable location, such as a fastener 18, for maintaining a taut resilient cord 30 around the hopper 12. The first connecting end 32 and the second connecting end 34 may have various hooks, loops, knots, or other connecting structures thereupon for more easily removably connecting to the hopper 12 and/or auger 19.

D. Bow Members

The present invention also includes multiple bow members 40, 45 to form an arcuate-shaped and taut sheet body 20 when covering the opening 14 of the hopper 12 to better prevent snow, rain, debris, etc. from accumulating upon and weighing down the sheet body 20, thus preventing the sheet body 20 from sagging, collapsing, or otherwise losing shape. The first bow member 40 and the second bow member 45 are preferably spaced apart along a lengthwise axis of the sheet body 20 and are further preferably parallel to each other in a manner so as to cross the lengthwise axis of the sheet body 20. The first bow member 40 and the second bow member 45 are further preferably comprised of a similar construction.

The first bow member 40 and the second bow member 45 are both preferably flexible in structure to bend and attach upon opposing lateral sides of the inside of the peripheral edge 13 of the opening 14 of the hopper 12, yet retain the bent shape. The center portion 43, 48 of each of the bow members 40, 45 is preferably sewn into the sheet body 20 via the second layer 22 so as to retain the bow members 40, 45 to the sheet body 20. The attachment of the bow members 40, 45 to the sheet body 20 helps to retain the ends 41, 42 and 46, 47 of the bow members 40, 45 in a substantially vertical or angular plane thus preventing the bow members 40, 45 from pivoting or rotating from side-to-side with respect to the sheet body 20 and also providing a more rigid support for the sheet body 20. In addition, by retaining the bow members 40, 45 to the sheet body 20, the second layer 22 or alternate method of retention helps to prevent loss or theft of the bow members 40, 45 with respect to the sheet body 20.

The ends 41, 42 of the first bow member 40 and the ends 46, 47 of the second bow member 45 are not sewn into the sheet body 20 and are preferably able to freely move with respect to the sheet body 20. This allows the ends 41, 42 of the first bow member 40 and the ends 46, 47 of the second bow member 45 to be positioned against the inside of the peripheral edge 13 (within the opening 14) and the peripheral portion 23 of the sheet body 20 to stretch over the peripheral edge 13 of the hopper 12 and be positioned around the outside of the peripheral edge 13 of the hopper 12. Thus, in an attached position the e ends 41, 42 of the first bow member 40 and the ends 46, 47 of the second bow member 45 extend in an angularly different plane than the peripheral portion 23 of the sheet body 20 and are spaced below the peripheral portion 23 of the sheet body 20 so as not to contact the sheet body 20.

A connecting member 50 also preferably extends between the center portion 43 of the first bow member 40 and the center portion 48 of the second bow member 45 to connect the bow members 40, 45 and further assist in retaining the bow members 40, 45 in a desired spatial relationship and orientation. The connecting member 50 is further preferably connected to the bow members 40, 45 on respective ends 51, 52.

The connecting member 50 is parallel to a lengthwise axis of the sheet body 20 and is perpendicular to the bow members 40, 45 and preferably extends along a center longitudinal axis of the sheet body 20. The connecting member 50 may be comprised of a similar construction as the bow members 40, 45. The connecting member 50 is further preferably sewn into the sheet body 20 via being positioned between the second layer 22 and the center portion 21 of the sheet body 20 (similar to the bow members 40, 45) to retain the connecting member 50 in proper position.

Each of the bow members 40, 45 and the connecting member 50 are further preferably separately sewn or attached to the sheet body 20 to maintain superior rigidity and orientation of the bow members 40, 45 and the connecting member 50. For example, the first bow member 40 is sewn around a perimeter of the first bow member 40 to the sheet body 20 and likewise for the second bow member 45 and the connecting member 50 so that there is a portion of the second layer 22 or sheet body 20 between each edge or corner of adjacent members 40, 45, 50.

E. Alternate Embodiment

Figure 7:
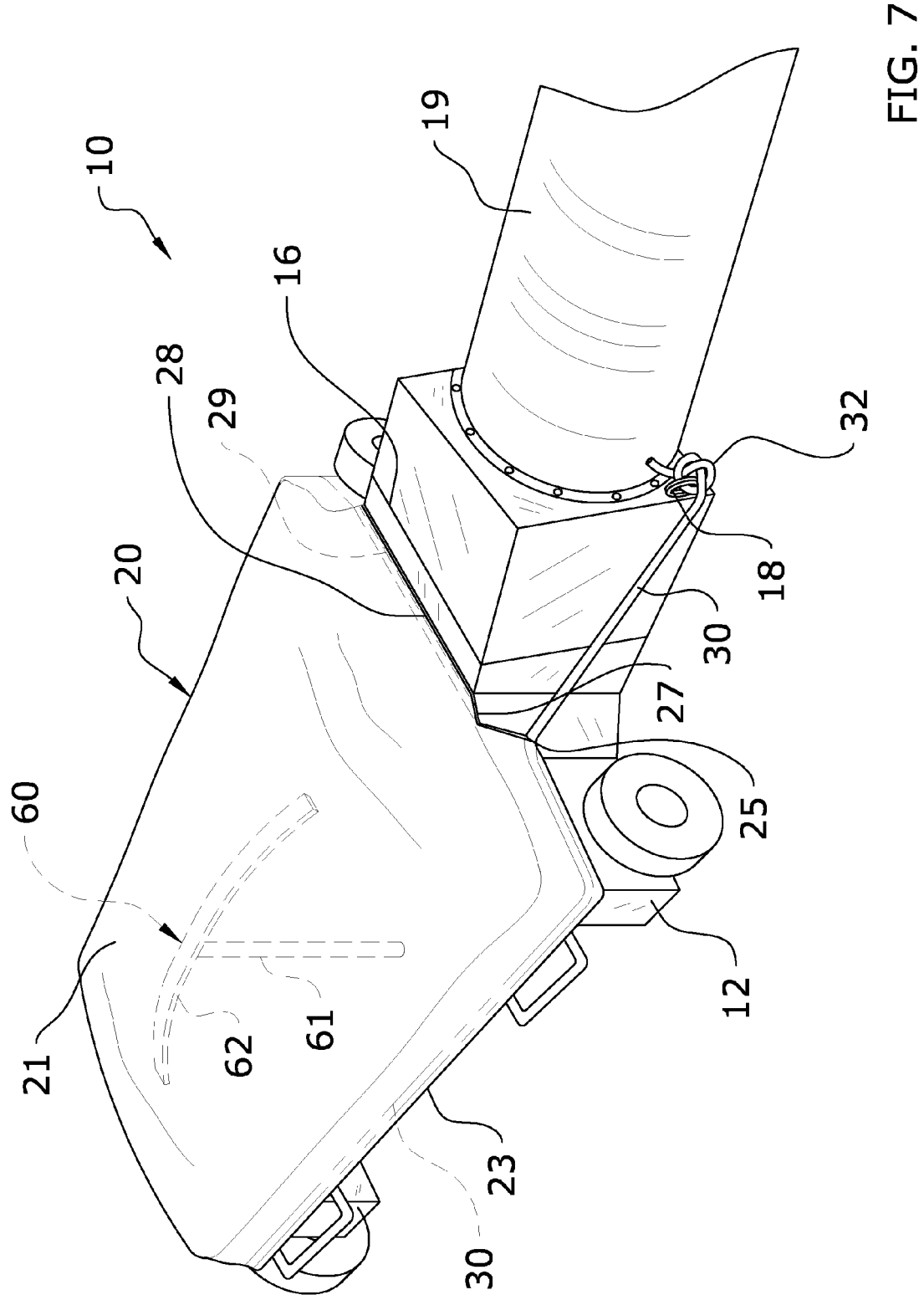
FIG. 7 is an upper perspective view of an alternate embodiment of the present invention.

In the alternate embodiment of FIG. 7, an internal support structure 60 supports the sheet body 20 from beneath to maintain the shape and form of the sheet body 20. The internal support structure 60 generally comprises a vertical column 61 resting on the floor of the hopper 12 and one or more wings 62 extending laterally outwardly, in a curved manner, from the upper end of the vertical column for contacting the underside of the sheet body 20. The wings 62 may sewn into or attached to the underside of the sheet body 20 as exemplified in the embodiment of FIGS. 1 through 6 or may be simply pressed against the underside of the sheet body 20. Various other structures may be utilized for maintaining the arcuate shape of the sheet body 20, such as internal structures or external structures, all which support and hold the sheet body 20 in the arcuate shape.

F. Operation of Preferred Embodiment

In use, the sheet body 20 is positioned over the opening 14 of the hopper 12 with the flap 28 positioned forwardly so that the flap 28 extends over the inlet covering 16 leading to the grain auger 19. The ends 41, 42 of the first bow member 40 and the ends 46, 47 of the second bow member 45 are then flexed downwardly and positioned within the opening 14 just below the inside of the peripheral edge 13 of the opening 14 of the hopper 12.

The outward reflex force of the bow members 40, 45 pushes against the sides of the hopper 12 thus retaining the bow members 40, 45 in the arcuate position. By positioning the bow members 40, 45 in the arcuate position, the sheet body 20 is also naturally formed to an arcuate shape. It is appreciated that more or less bow members 40, 45 may be utilized depending on the size of the hopper 12 and/or the force needed to retain the sheet body 20 in the arcuate shape.

The peripheral portion 23 of the sheet body 20 is ensured to be pulled over and positioned around the exterior side of the peripheral edge 13 of the opening 14 of the hopper 12 and the first connecting end 32 and the second connecting end 34 are pulled tight to tighten the peripheral portion 23 of the sheet body 20 around the exterior of the hopper 12 (along the peripheral edge 13). The first connecting end 32 and the second connecting end 34 may then be extended forwardly and connected to the hopper 12, the auger 19, upon themselves or each other, or anywhere that provides a secure anchoring point. The flap 28 is also stretched forwardly and positioned over the inlet covering 16 of the auger 19. The flap 28 may be secured thereto via the fastener 29 of the flap 28 attaching to the fastener 17 around the inlet covering 16 of the auger 19 or may be secured in various other manners.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A cover for a grain hopper, comprising:
 a flexible sheet body having a center portion and a peripheral portion;
 wherein said center portion is adapted to extend over an opening of said grain hopper and wherein said peripheral portion is adapted to extend over an external side of a peripheral edge of an opening of said grain hopper;
 an elongated member retained along said peripheral portion of said sheet body and attached thereto, said elongated member adapted to adjust a diameter of said peripheral portion around an external side of a peripheral edge of an opening of said grain hopper; and
 a first bow member attached to said sheet body along an interior side of said center portion for forming an arcuate-shaped said sheet body, said first bow member being detached from said sheet body along an interior side of said peripheral portion so as to flex away from said peripheral portion of said sheet body, said first bow member adapted to connect to an internal side of a peripheral edge of an opening of said grain hopper;
 a second bow member attached to said sheet body along an interior side of said center portion for forming an arcuate-shaped said sheet body, said second bow member being detached from said sheet body along an interior side of said peripheral portion so as to flex away from said peripheral portion of said sheet body, said second bow member adapted to connect to an internal side of a peripheral edge of an opening of said grain hopper;
 a connecting member extending between said first bow member and said second bow member, wherein said connecting member extends perpendicular with respect to said first bow member and said second bow member.

2. The cover of claim 1, wherein said sheet body has a flap extending from a forward end of said sheet body.

3. The cover of claim 2, wherein said flap has a fastener along a bottom surface for connecting to an inlet covering extending from said grain hopper.

4. The cover of claim 1, wherein said elongated member includes a first connecting end and a second connecting end opposite thereof, each of said first connecting end and said second connecting end extend outwardly from said peripheral portion of said sheet body.

5. The cover of claim 1, wherein said elongated member is comprised of a resilient cord.

6. The cover of claim 1, wherein said first bow member is spaced apart from said second bow member.

7. The cover of claim 6, wherein said sheet body includes an inner, second layer covering an interior side of a center portion of said first bow member and said second bow member, said inner, second layer and said center portion of said sheet body forming a space between thereof for receiving said center portion of said first bow member and said second bow member.

8. A grain hopper cover system, comprising:
- a grain hopper extending from a grain auger, said grain hopper having an opening along a top side that leads to a transfer member within said grain hopper and leading to said grain auger; and
- a cover detachably connected to said grain hopper for shielding said opening, said cover being entirely supported with said grain hopper and said grain auger thus movable with said grain hopper and said grain hopper;
- said cover having a flexible sheet body having a center portion and a peripheral portion, wherein said center portion is adapted to extend over said opening of said grain hopper and wherein said peripheral portion is adapted to extend over an external side of a peripheral edge of said opening of said grain hopper;
- said cover includes an elongated member retained along said peripheral portion of said sheet body and attached thereto, said elongated member adapted to adjust a diameter of said peripheral portion around said external side of said peripheral edge of said opening of said grain hopper;
- said cover having a first bow member attached to said sheet body along an interior side of said center portion for forming an arcuate-shaped said sheet body, said first bow member being detached from said sheet body along an interior side of said peripheral portion so as to flex away from said peripheral portion of said sheet body, said first bow member adapted to connect to an internal side of said peripheral edge of said opening of said grain hopper by being retained against said internal side of said peripheral edge of said opening of said grain hopper;
- said cover having a second bow member attached to said sheet body along an interior side of said center portion for forming an arcuate-shaped said sheet body, said second bow member being detached from said sheet body along an interior side of said peripheral portion so as to flex away from said peripheral portion of said sheet body, said first second member adapted to connect to an internal side of said peripheral edge of said opening of said grain hopper by being retained against said internal side of said peripheral edge of said opening of said grain hopper;
- wherein said first bow member is spaced apart from said second bow member and wherein said sheet body includes an inner, second layer covering an interior side of a center portion of said first bow member and said second bow member, said inner, second layer and said center portion of said sheet body forming a space between thereof for receiving said center portion of said first bow member and said second bow member.

9. The cover of claim 8, wherein said sheet body has a flap extending from a forward end of said sheet body.

10. The cover of claim 9, wherein said flap has a first fastener along a bottom surface for connecting to a second fastener of an inlet covering of said grain hopper.

11. The cover of claim 8, wherein said elongated member includes a first connecting end and a second connecting end opposite thereof, each of said first connecting end and said second connecting end extend outwardly from said peripheral portion of said sheet body and connect to said grain auger or said grain hopper.

12. The cover of claim 11, wherein said elongated member is comprised of a resilient cord.

* * * * *